(12) United States Patent
Huntsberger et al.

(10) Patent No.: US 6,554,087 B2
(45) Date of Patent: Apr. 29, 2003

(54) STEERING ASSEMBLY FOR CHILDREN'S RIDE ON VEHICLES

(75) Inventors: Kurt J. Huntsberger, Chaffee, NY (US); Daniel J. Damon, South Wales, NY (US); Steven Robert Drosendahl, Hamburg, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/780,592

(22) Filed: Feb. 8, 2001

(65) Prior Publication Data

US 2002/0104696 A1 Aug. 8, 2002

(51) Int. Cl.$^7$ .............................. B60K 1/00; B62D 7/20
(52) U.S. Cl. .................... 180/65.1; 280/267; 280/93.51
(58) Field of Search .......................... 180/65.1; 280/267, 280/269, 93.51, 93.515

(56) References Cited

U.S. PATENT DOCUMENTS

| | | | |
|---|---|---|---|
| 1,217,704 A | | 2/1917 | Ciaffone |
| D218,630 S | | 9/1970 | Steele |
| 3,669,468 A | | 6/1972 | Rich |
| 3,768,825 A | * | 10/1973 | Magnusson .................. 280/96 |
| 3,960,392 A | | 6/1976 | Read |
| 4,103,921 A | | 8/1978 | Brooks et al. |
| 4,165,094 A | * | 8/1979 | Onda ......................... 280/269 |
| 4,186,935 A | * | 2/1980 | Rudwick .................... 280/269 |
| 4,460,190 A | * | 7/1984 | Spiess ........................ 280/247 |
| 4,469,344 A | * | 9/1984 | Coil ............................ 280/269 |
| 4,497,502 A | * | 2/1985 | Forbes et al. ............... 280/269 |
| 4,516,648 A | | 5/1985 | Berger et al. |
| 4,580,802 A | * | 4/1986 | Herman et al. ............. 280/267 |
| 4,624,469 A | * | 11/1986 | Bourne, Jr. ................. 180/210 |
| 4,705,449 A | | 11/1987 | Christianson et al. |
| D303,776 S | | 10/1989 | Aker |
| D314,389 S | | 2/1991 | Lynnes et al. |
| 5,409,263 A | | 4/1995 | Klawitter |
| D368,743 S | | 4/1996 | Amburgey et al. |
| 5,762,351 A | * | 6/1998 | SooHoo ...................... 180/210 |
| 5,845,724 A | * | 12/1998 | Barrett ....................... 180/65.1 |
| 5,901,973 A | * | 5/1999 | Warren ....................... 280/267 |
| 5,931,244 A | * | 8/1999 | Renfroe et al. ........... 280/93.51 |
| 6,105,982 A | | 8/2000 | Howell et al. |
| D431,845 S | * | 10/2000 | Huntsberger ............... D21/434 |
| 6,170,354 B1 | * | 1/2001 | Lee .......................... 280/93.51 |
| 6,186,256 B1 | * | 2/2001 | Dignitti ..................... 180/68.5 |
| 6,330,926 B1 | * | 12/2001 | Heimbrock et al. ....... 180/65.1 |
| 6,352,274 B1 | * | 3/2002 | Redman ..................... 280/248 |
| 6,367,824 B1 | * | 4/2002 | Hayashi ............... 280/124.103 |

OTHER PUBLICATIONS

Caterpillar® Dump Truck Owner's Manual, Power Wheels by Fisher–Price, 1999.
Caterpillar® Front Loader Jr. Owner's Manual, Power Wheels by Fisher–Price, 1997.

* cited by examiner

Primary Examiner—Paul N. Dickson
Assistant Examiner—Joselynn Y. Sliteris
(74) Attorney, Agent, or Firm—Kolisch Hartwell, P.C.

(57) ABSTRACT

A steering assembly for a children's ride-on vehicle having a pair of wheels. The assembly includes a pair of pivotal control arms that are coupled to the pair of wheels. The pair of pivotal control arms is also coupled to a pair of moveable handles that operate in tandem and move reciprocally to steer the pair of wheels.

23 Claims, 6 Drawing Sheets

STEERING ASSEMBLY FOR CHILDREN'S RIDE ON VEHICLES

FIELD OF THE INVENTION

The present invention is directed to children's ride-on vehicles, and more particularly, to a steering mechanism for children's ride-on vehicles and children's ride-on vehicles incorporating the same.

BACKGROUND

Battery-powered children's ride-on vehicles are popular toys for children. Typically, these vehicles are reduced-scale vehicles sized for use by a child. These vehicles often resemble reduced-scale versions of real-life vehicles operated by adults. In such a vehicle, the features on the full-sized vehicles are typically simulated to make the children's vehicle more appealing to children.

Steering mechanisms in children's vehicles typically resemble a steering wheel. Children steer the vehicle by turning the wheel in the desired direction. However, other steering mechanisms are known for full-sized vehicles, which do not utilize a steering wheel. For example, various construction vehicles, such as a skid steer loader, may incorporate a pair of steering handles instead of a steering wheel. Reduced-sized vehicles may want to imitate the appearance and functionality of such alternative steering mechanisms. However, such a children's vehicle using an alternative steering mechanism must be adapted to provide safety features to make the vehicles suitable for use by children, and especially younger children.

SUMMARY OF THE INVENTION

The present invention provides a steering assembly for a children's ride-on vehicle having a pair of wheels. The steering assembly includes a pair of pivotal control arms that are coupled to the pair of wheels. The pair of pivotal control arms is also coupled to a pair of moveable handles that operate in tandem and move reciprocally to steer the pair of wheels. The steering assembly also includes a coupler configured to link the control arms, such that they operate cooperatively to steer the vehicle.

DETAILED DESCRIPTION AND BEST MODE OF THE INVENTION

Figure 1:
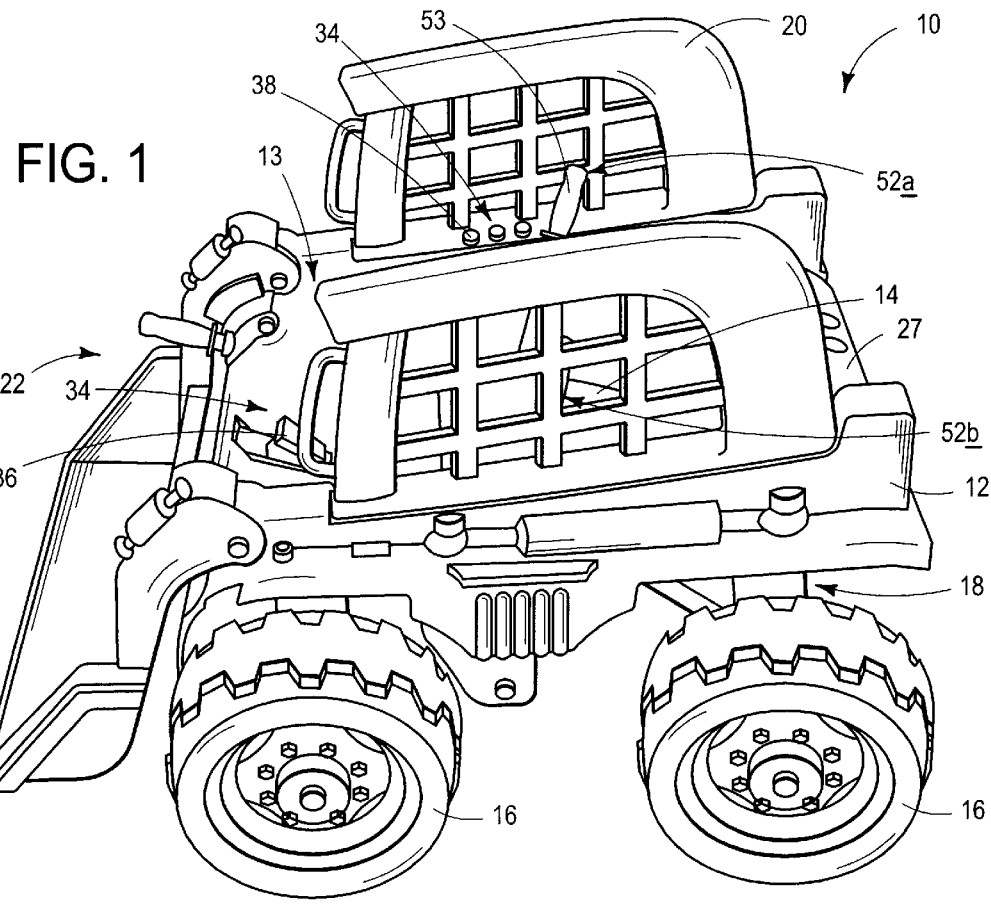
FIG. 1 is an isometric view of a children's ride-on vehicle in accordance with the present invention.

A children's ride-on vehicle constructed according to the present invention is indicated generally at 10 in FIG. 1. Vehicle 10 includes a body 12, seat 14, wheels 16 and steering assembly 18.

Figure 5:
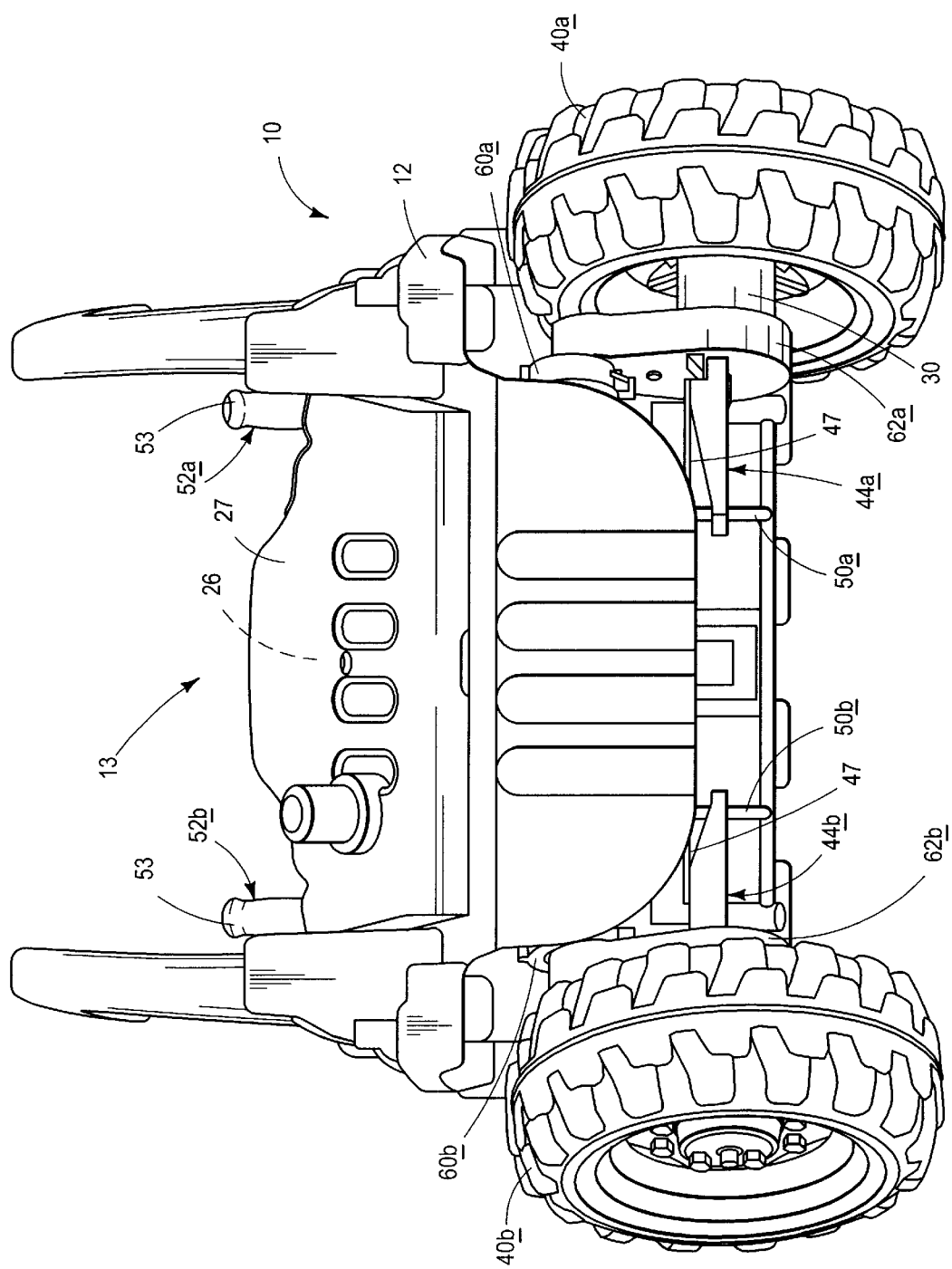
FIG. 5 is a rear view of the ride-on vehicle of FIG. 1 with the steering assembly positioned to turn the vehicle to the right.
Figure 6:
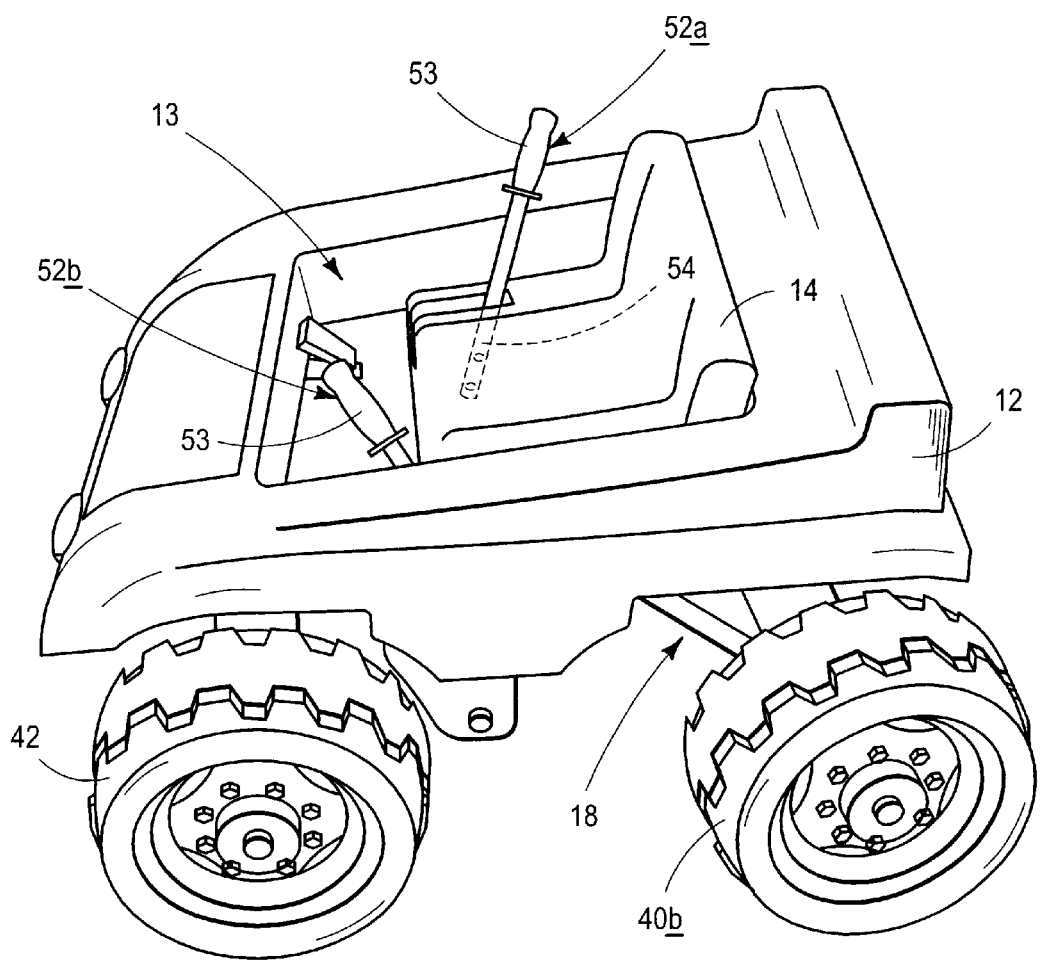
FIG. 6 is a fragmentary side isometric view of the vehicle of FIG. 1 showing details of the steering assembly with the steering assembly positioned to turn the vehicle to the right and also showing another suitable body shape for the vehicle shown in FIG. 1.

Children's ride-on vehicle 10 is sized for operation by a child. Vehicle 10 may resemble a reduced scale or scaled-down version of a larger adult vehicle or it may take the form of a child-sized fantasy vehicle, that does not have a full-sized counterpart. Vehicle 10, as shown in the exemplary embodiments described below (FIGS. 1, 3–5), resembles a full-size skid steer loader. However, it is within the scope of the invention, that steering assembly 18 may be configured for use on any type of battery-powered children's ride-on vehicle. For example, as shown in FIG. 6, vehicle 10 may resemble a truck. Moreover, vehicle 10 may take any one of a variety of forms adapted to resemble a real-sized vehicle in a reduced scale, including but not limited to, cars, farm vehicles, off-road vehicles, construction vehicles, aircraft and sea craft.

Regardless of the type of vehicle that children's ride on vehicle 10 resembles, vehicle 10 includes a support frame or body 12. Body 12 includes a passenger region 13. The passenger region of body 12 is adapted and sized to carry at least one child. To accommodate a child or children, passenger region 13 of body 12 typically includes at least one seat 14 sized to receive at least one child. For example, passenger region 13 in vehicle 10, as shown in FIGS. 1 and 6, is sized to permit a child to easily access the controls in vehicle 10.

Body 12 is typically formed from moldable plastic and may be a single integral unit or may include multiple parts. The multiple parts are typically secured together by screws, bolts, nuts, rivets, clips, or other conventional fasteners. Moreover, it should be understood that the body may be formed from any other suitable materials, and such a construction is within the scope of the invention.

Vehicle 10 may also include additional features to make the vehicle resemble a corresponding adult version. The exemplary vehicle shown in FIGS. 1 and 3–5 is constructed to resemble a full-size skid steer loader. Hence, features on a full-sized skid steer loader may be imitated in the reduced-sized vehicle. For example, exemplary vehicle 10 includes a simulated roll cage 20 to make the vehicle appear more like a full-sized skid steer loader. Roll cage 20 may be made of molded plastic or any other suitable material. Roll cage 20 may be removable, however the exemplary embodiment shows a roll cage, which is not intended to be removed. Although shown having two sidepieces, roll cage 20 may have other configurations and may also be constructed as a single integral unit forming an enclosed region.

Exemplary vehicle 10 also includes bucket assembly 22 disposed on the front region of body 12 of vehicle 10. Bucket assembly 22 is adapted to provide a mechanism for loading, unloading, and transporting different items, including, dirt, rocks, and any other items that a child may load into the shovel. Bucket assembly 22 may be movable between a plurality of positions. One example of a suitable bucket assembly is described in copending U.S. patent application Ser. No. 09/779,989, which was filed on Feb. 8, 2001, entitled "Children's Ride-On Vehicle and Bucket Assembly," the complete disclosure of which is hereby incorporated by reference.

Additional or other features may also be present on vehicle 10 depending on the vehicle that vehicle 10 is intended to resemble. For example, features typically found on a car or truck may be imitated, including but not limited to, side doors, trunks, windshields, wipers, hoods, headlights, taillights, etc. Likewise, features found on other vehicles may be simulated to make children's vehicle 10 more realistic or appealing to children. However, it should be understood, that the steering assembly described herein may be used on any battery-powered children's ride-on vehicles, regardless of the particular body style and/or accessories of the particular vehicle, as the body style and/or accessories are not essential and may vary, without departing from the scope of the invention.

Vehicle 10 also includes a plurality of wheels, which are generally indicated at 16, and which permit vehicle 10 to move across a ground surface. Wheels 16 are rotatively coupled to body 12 of vehicle 10. Vehicle 10 in FIGS. 1, 3, and 6 includes four wheels, however, the number of wheels may vary. Vehicles with two or more wheels are within the scope of the invention, but children's vehicles will typically include at least three wheels to provide stability. Moreover, although the wheels are shown to be generally the same size, it should be understood that any combination of different sized wheels are within the scope of the invention.

Figure 2:
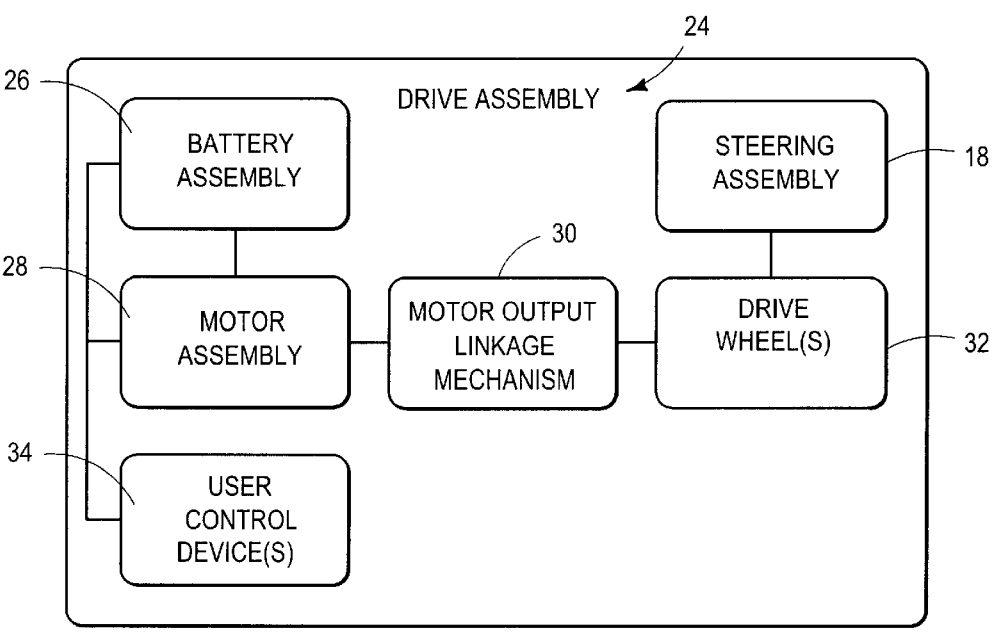
FIG. 2 is a schematic block diagram of a drive assembly of the ride-on vehicle of FIG. 1.

Vehicle 10 further includes a drive assembly 24. Drive assembly 24, as schematically illustrated in FIG. 2, includes battery assembly 26, motor assembly 28, motor output linkage mechanism 30, and at least one driven wheel 32. Battery assembly 26 includes at least one battery adapted to provide power to motor assembly 28. Battery assembly 26 is electrically coupled to motor assembly 28 through coupling devices. The coupling devices may include cords, cables, wires or similar electrical connectors.

Figure 4:
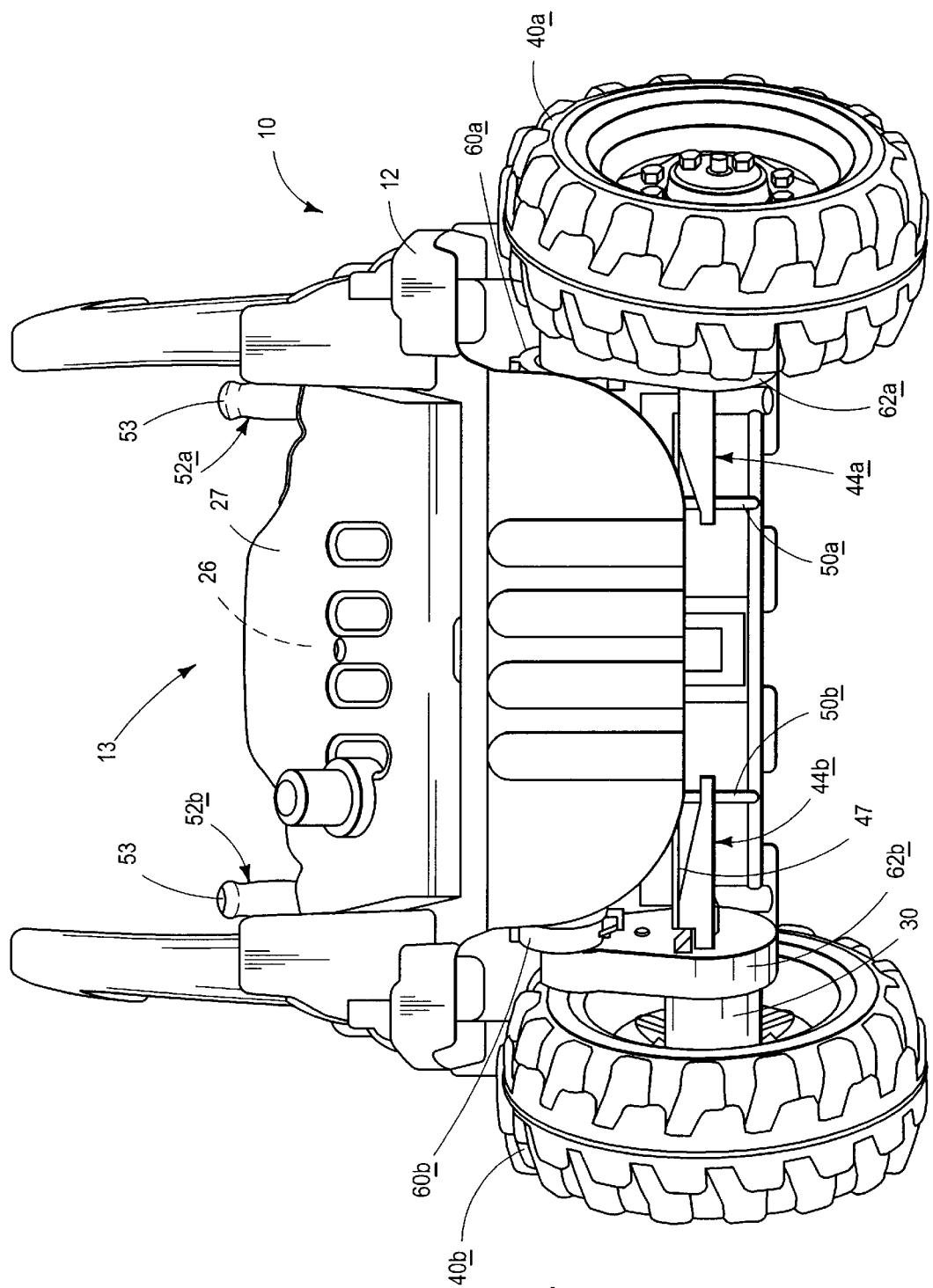
FIG. 4 is a rear view of the ride-on vehicle of FIG. 1 with the steering assembly positioned to turn the vehicle to the left.

In the illustrated embodiments, vehicle 10 includes driven rear wheels, 40a and 40b. "Driven wheels" are driven in the sense that they receive the rotational output from motor assembly 28, which causes rotation of the drive wheels about their axles or mounts to produce movement of vehicle 10. It should be appreciated that drive assembly 24 could be coupled to drive only one of the rear wheels, one of the front wheels, both front wheels, all four wheels, one front wheel and one rear wheel, or any combination thereof. In other words, vehicle 10 may be rear-wheel driven (as illustrated in FIGS. 4 and 5), front-wheel driven, diagonally driven or all-wheel driven.

Battery assembly 26 is typically adapted to be mounted to body 12 to provide power to motor assembly 28. Depending on the size and shape of battery assembly 26 and the shape of vehicle 10, battery assembly 26 may be disposed at any desired location on body 12. For example, battery assembly 26 may be mounted under seat 14 or within a storage compartment. In the exemplary embodiment, battery assembly 26 is supported in a compartment 27 in the rear of vehicle 10. Alternatively, battery assembly 26 may be disposed elsewhere in vehicle 10.

Battery assembly 26 may include one or more conventional batteries. Typically, battery assembly 26 may include one or more six and/or twelve volt batteries adapted to power motor assembly 28. Alternatively, batteries with different voltages, other than six or twelve volts, may also be used. Moreover, the batteries may be rechargeable batteries.

Motor assembly 28 includes at least one motor adapted to drive at least one driven wheel 32, as schematically illustrated in FIG. 2. In the illustrated embodiment, motor assembly 28 includes motors 60a and 60b (as shown in FIGS. 4 and 5). Motors 60a and 60b, as shown in the present embodiment, are battery-powered motors, but it should be understood that other power sources may be used and are within the scope of the invention. Motor assembly 28 may be coupled directly to the wheels or may be indirectly coupled to the wheels with a motor output linkage assembly 30, as shown in FIG. 2. Examples of suitable motor output linkage assemblies include gears, belts, or other similar linkages. In FIGS. 4 and 5, motor output linkage assembly 30 is shown in the form of gear boxes 62a and 62b, which contain at least one gear and rotationally connect the motor outputs, such as an output gear or pinion, to corresponding driven wheels. Motor assembly 28 may also drive other movable components on vehicle 10.

Drive assembly 24 may be configured to allow vehicle 10 to travel across a surface at different user-selected speeds. By using multiple motors, multiple batteries, and/or gear boxes, vehicle 10 may be driven at two or more user-selected speeds. Motor assembly 28 may direct driven wheel 32 to rotate faster or slower using a gear box to control the relative rate of rotation of the driven wheel relative to the output of the motor assembly. Additionally, or alternatively, two or more motors and/or batteries may be selectively switched between series and parallel configurations. Moreover, vehicle 10 may be adapted such that it is operable in reverse where the driven wheel is directed to rotate in a reverse direction.

Vehicle 10 may also include user control devices 34 (FIGS. 1 and 2) that may be connected to battery assembly 26 and/or motor assembly 28 (FIG. 2). Such control devices allow a user to control the operation of the vehicle, as well as the speed of the vehicle. For example, as illustrated in FIG. 1, vehicle 10 includes a pedal 36 which allows a rider to control motor assembly 28, and therefore, control the operation of the drive wheel or wheels. Pedal 36 is positioned such that a child can comfortably reach pedal 36 when seated on seat 14 of vehicle 10. Additionally, vehicle 10 may also include buttons, reverse and speed control switches, levers, knobs and other devices, such as schematically illustrated at 38 in FIG. 1, which are used to control drive assembly 24 of vehicle 10 and are preferably positioned for actuation by a child seated on seat 14.

A child rider can also control the path along which vehicle 10 travels using steering assembly. Steering assembly 18 is coupled to at least one steerable wheel, which may also, but is not necessarily, be at least one of the driven wheels. For example, as shown schematically in FIG. 2, steering assembly 18 is coupled to drive wheel or wheels 32. Alternatively, steering assembly 18 may be coupled to one or more of the non-driven wheels or may be coupled to a combination of driven and non-driven wheels.

Figure 3:
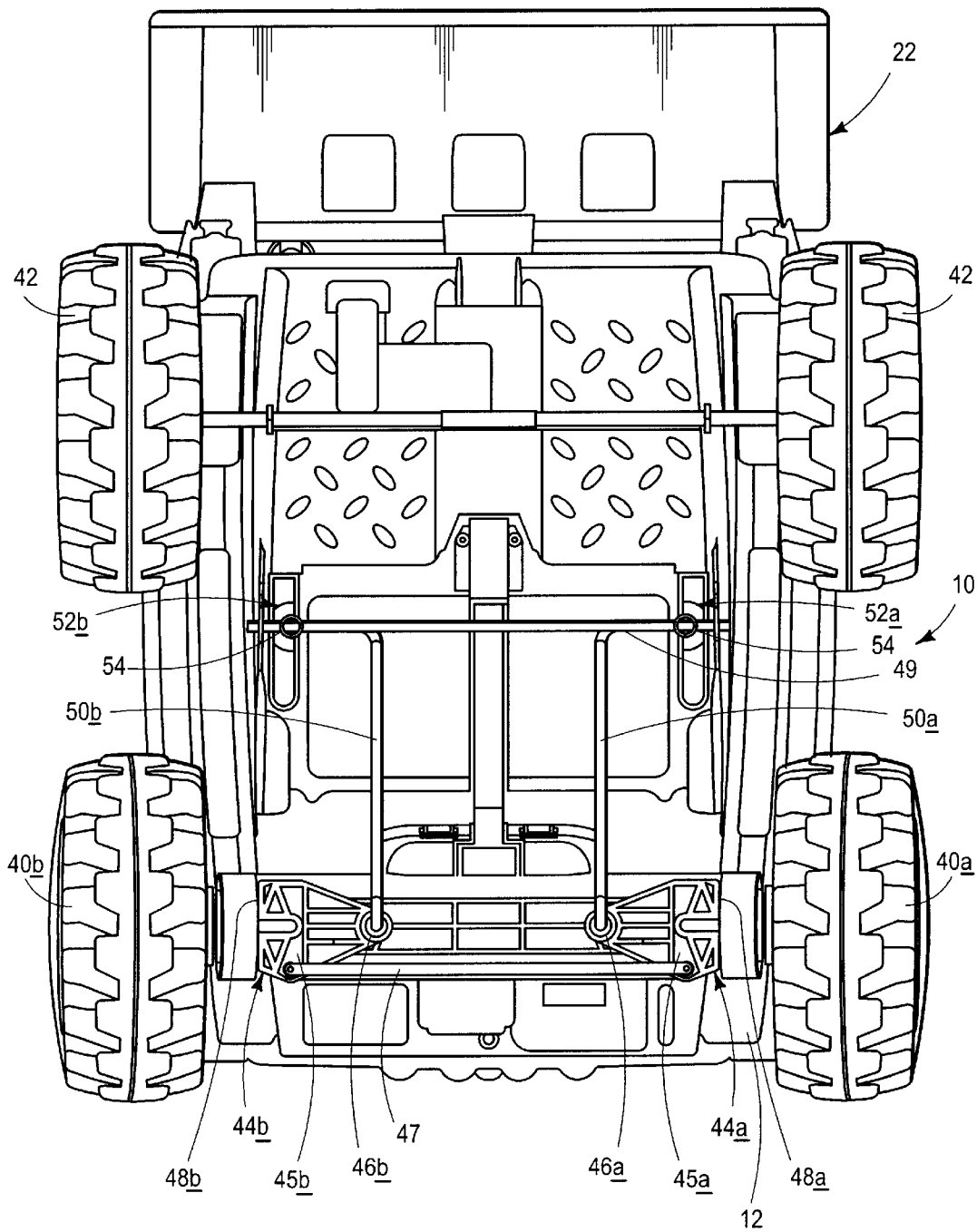
FIG. 3 is a view from below of the ride-on vehicle of FIG. 1 showing details of a steering assembly constructed in accordance with the present invention.

In FIG. 3, which provides an underside view of vehicle 10, steering assembly 18 can be more readily understood. The right and left side of vehicle 10 have been indicated by "a" and "b" respectively. In the exemplary embodiment, rear wheels 40a and 40b are driven by motor assembly 28 (not shown). A front pair of wheels 42 is non-driven and is allowed to freely rotate in the direction of the vehicle's motion. These non-driven wheels are not directly or indirectly coupled to motor assembly 28 and instead are caused to rotate by frictional engagement with the ground surface along which vehicle 10 travels.

Driven wheels 40a and 40b are coupled to a control arm 44a and a control arm 44b respectively. Each control arm 44a and 44b is pivotal about an axis, which extends generally or completely vertically though vehicle 10 to the ground surface. These pivotal control arms operate to turn wheels 40a and 40b by pivoting such that the attached wheel is turned in a desired direction. It should be understood that control arms 44a and 44b may also be coupled to the non-driven wheels. The control arms may be coupled to the non-driven wheels in combination with a coupling to the driven wheels or alternatively, the control arms may be coupled to the non-driven wheels independently of any coupling to the driven wheels.

Figure 7:
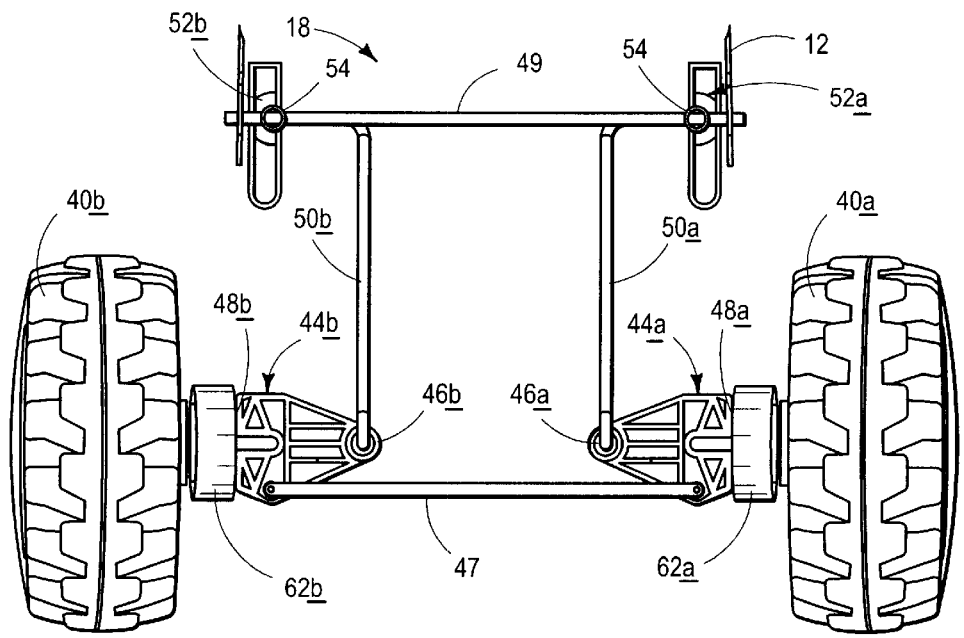
FIG. 7 is a fragmentary view from below of the steering assembly constructed in accordance with the present invention.
Figure 8:
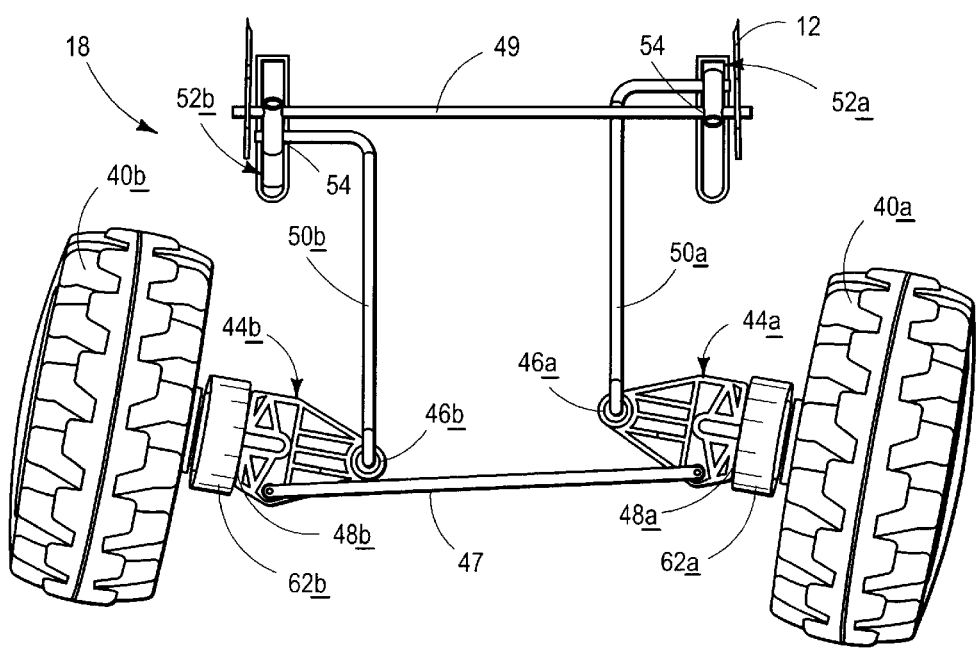
FIG. 8 is fragmentary view from below of the steering assembly in a turned position constructed in accordance with the present invention.

In the exemplary embodiment, as best shown in FIGS. 3, 7–8, control arms 44a and 44b are generally triangularly shaped 45a and 45b. Each triangularly shaped control arm 45a and 45b has a base 48a and 48b. The effective base 48a and 48b of each triangularly shaped control arm 45a and 45b is coupled to the respective wheel 40a and 40b. A pivot point 46a and 46b is disposed on a vertex region opposite the base 48a and 48b of each triangularly shaped control arm 45a and 45b and each pivot point 46a and 46b is disposed toward the center of vehicle 10. Each pivot point 46a and 46b converts motion from handles 52a and 52b to rotational motion of control arms 45a and 45b to turn wheels 40a and 40b. Other shapes and configurations for control arms 44a and 44b are within the scope of the invention.

Steering assembly 18 also includes a coupler 47, which connects control arm 44a with control arm 44b. Coupler 47 operates to link motion of control arm 44a and wheel 40a with a comparable motion in control arm 44b and wheel 40b. Coupler 47 may be formed as a single piece, or a plurality of components that are fixed together. In the exemplary embodiment shown in FIG. 3, coupler 47 is a steering support that attaches to the rear portions of control arms 44a and 44b. However, coupler 47 may be attached anywhere on control arms 44a and 44b and such alternative placement is within the scope of the invention. Coupler 47 may be attached to control arms 44a and 44b by passing through a retaining mechanism, such as an aperture or clip, or by conventional fasteners, such as bolts, screws, etc. These fasteners may be received through apertures in control arms 44a and 44b. Coupler 47 may be made out of any rigid durable material. Additionally and/or alternatively, additional couplers may be used within steering assembly 18. For example, in the exemplary embodiment handle assembly support 49 links steering assembly 18 to body 12.

Each control arm 44a and 44b is coupled through a steering linkage 50a and 50b to steering handles 52a and 52b. Steering linkages 50a and 50b extend generally parallel to the elongate axis of vehicle 10. As shown in FIG. 3, steering linkages 50a and 50b respectively extend from the control arms 44a and 44b to steering handles 52a and 52b, which are disposed centrally within vehicle 10.

Steering handles 52a and 52b extend up through body 12 of vehicle 10. Steering handles 52a and 52b are configured to be accessible to a child rider seated on seat 14 of vehicle 10. Each steering handle 52a and 52b includes a graspable portion 53 configured to be grasped by a child rider when seated on seat 14. Graspable portion 53 of steering handles 52a and 52b extends outward from body 12 into the passenger region of body 12 through an opening in body 12.

Each handle further includes a joinder portion 54, which couples each handle to the steering assembly. Joinder portion 54, as best shown in FIGS. 6–8 of steering handles 52a and 52b extends below body 12 and serves to connect each respective steering linkage 50a and 50b to steering handles 52a and 52b. Joinder portion 54 of each handle 52a and 52b is also coupled to handle assembly support 49, which extends from one side of body 12 to the other side. Each handle 52a and 52b pivots about handle assembly support 49. Any suitable method of coupling steering linkage 50a and 50b and handle assembly support 49 to joinder portion 54 may be used. For example, in FIG. 6, apertures are shown in joinder portion 54 of handle 52a, which are used to couple steering linkage 50a and handle assembly support 49 to handle 52a.

Handle assembly support 49 is attached to body 12, as described earlier, and is coupled to the joinder portion of each steering handle 52a and 52b. Steering handles 52a and 52b pivot on handle assembly support 49. Handle assembly support 49 provides support and links steering handles 52a and 52b together. Handle assembly support 49 may also operate to stabilize steering assembly 18.

Steering handles 52a and 52b are pivotal about an axis, which extends generally transversely to the elongate axis extending from the front of vehicle 10 to the rear of vehicle 10. Hence, steering handles 52a and 52b pivot forward toward the front of vehicle 10 and rearward toward the rear of vehicle 10. Steering handles move cooperatively such that when steering handle 52a moves in a first direction, steering handle 52b moves in a second direction, which is opposite and at least generally parallel to the first direction.

Although steering handles 52a and 52b are shown in the illustrated embodiments, alternative steering mechanisms may be used to relay user steering inputs to the underlying structure described herein. For example, alternative steering mechanism may be used to control steering linkages 50a and 50b and control arms 44a and 44b. The alternative steering mechanism may be any steering device known in the art which is configured to engage the steering assembly described herein, including but not limited to, a steering wheel, handle bars, foot pedals or levers. Moreover, FIG. 3 shows two steering handles 52a and 52b, which are pivotal by a child rider to steer the rear-driven wheels. Alternatively, handles 52a and 52b may be configured to steer the front non-driven wheels, front driven wheels, a combination of driven and non-driven wheels, or all four wheels.

Generally, steering assembly 18 operates by movement of steering handles 52a and 52b which effects control arms 44a and 44b to pivot causing the associated wheels to be turned. More particularly in the exemplary embodiments, steering handles 52a and 52b are moveable by a child rider seated in passenger region 13. Each handle pivots along the elongate axis of vehicle 10. As each handle 52a and 52b is moved, the respective steering linkage 50a and 50b is drawn forward or backward. Consequently, as steering linkage 50a and 50b are moved, control arms 44a and 44b are pivoted causing the wheels to turn in the desired direction. Both wheels turn in tandem due to coupler 47 and handle assembly support 49.

Turning attention to FIG. 4, vehicle 10 is shown with wheels 40a and 40b turned to effect a left hand turn. Steering handle 52a has been moved forward towards the front portion of the passenger region. Forward motion of steering handle 52a results in the reverse motion of steering handle 52b which is driven backwards toward the rear of the passenger region of vehicle 10. As a result of the forward motion of steering handle 52a, steering linkage 50a is drawn forward toward the front of vehicle 10. As steering linkage 50a is drawn forward, control arm 44a is pivoted about its pivot point causing the rear of wheel 40a to twist inwards toward vehicle 10. The front of wheel 40a is turned outward away from body 12 of vehicle 10.

Similarly, since control arm 44a is linked to control arm 44b, control arm 44b is also turned. The rear of wheel 40b is turned outward, such that the space between control arm 44a and 44b remains essentially the same. The front of wheel 40b is concurrently twisted inward such that both wheels 40a and 40b are turned in the same direction. The front wheels, which are non-driven wheels in this exemplary embodiment, freely rotate as vehicle 10 changes direction.

Likewise, FIG. 5 shows vehicle 10 with wheels 40a and 40b turned to effect a right hand turn. Steering handle 52a, has been moved rearward toward the rear portion of the passenger region of vehicle 10. Simultaneously, steering handle 52b is drawn forward towards the front portion of the passenger region of vehicle 10. As a result, steering linkage, 50a is pushed rearward toward the rear of vehicle 10, causing control arm 44a to pivot. Consequently, the rear portion of wheel 40a is turned outward away from body 12 and the front portion of wheel 40a is pulled inward toward the center of body 12. Similarly and concurrently, wheel 40b is turned to allow vehicle 10 to change direction.

Both wheels 40a and 40b, as shown in FIGS. 4 and 5, are motor driven. Motors 60a and 60b drive motor output linkages or gear boxes 62a and 62b to effect rotation motion. Motor output linkages or gear boxes 62a and 62b are operatively coupled to wheels 40a and 40b. However, it is not necessary that each wheel be driven. It is within the scope of the invention, that steering assembly 18 be coupled to non-driven wheels. Moreover, steering assembly 18 may be coupled to one driven wheel and one non-driven wheel.

Attention is drawn to the position of handles 52a and 52b in FIG. 6. FIG. 6 is a perspective view of vehicle 10 turning as shown in FIG. 5. As described above, handles 52a and 52b are positioned to be grasped by a child rider seated on seat 14 of vehicle 10. Handles 52a and 52b operate in tandem and move reciprocally. Hence, as one of the handles is moved forward towards the front of the passenger region of vehicle 10, the other handle moves backwards toward the rear of the passenger region of vehicle 10. For example, as shown in FIG. 6, when handle 52b is forward, handle 52a is rearward. As handle 52b is drawn backward, handle 52a will move forward. As each handle is moved forward, the associated wheel is twisted such that the front of the wheel extends outwardly from body 12 and the rear part of the wheel extends inwardly towards body 12.

By comparing FIGS. 7 and 8, attention is drawn to the reciprocal motion of the components in steering assembly 18. FIG. 7 shows steering assembly 18 where handles 52a and 52b are parallel to each other. Neither wheel 40a nor 40b is turned. With the configuration shown in FIG. 7, vehicle 10 would proceed in a straight line.

In contrast, FIG. 8 shows the result of movement of handles 52a and 52b to cause vehicle 10 to turn. As described above, slots in body 12 allow handles 52a and 52b to pivot forward and backward. Handle assembly support 49 may be attached to body 12 and to handles 52a and 52b as shown in FIGS. 7 and 8. As handles 52a and 52b move reciprocally, or in opposite directions, handle assembly support linkages 50a and 50b also move reciprocally. As handle assembly support linkages 50a and 50b are drawn forward and backwards, each respective control arm 44a and 44b pivots. The pivotal motion of each control arm results in the turning motion of wheels 40a and 40b.

As described above, steering assembly 18 provides a steering arrangement that is versatile and useable for a variety of children's ride-on vehicles. Furthermore, steering assembly 18 is configured to be durable and adaptable to the abuses that occur during children's play. While various alternative embodiments and arrangements of steering assembly 18 have been shown and described above, it will be appreciated by those of skill in the art, that numerous other embodiments, arrangements, and modifications are possible and are within the scope of the invention.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle, comprising:
    a vehicle body shaped to resemble a skid steer loader having a passenger region sized to receive a child and including a seat adapted to accommodate a child;
    a plurality of wheels rotatably coupled to the body, wherein the plurality of wheels includes two rear wheels;
    a bucket assembly attached to the vehicle body;
    a simulated roll cage extending from the vehicle body to define at least a portion of the passenger region;
    a motor assembly configured to drive the two rear wheels;
    a battery assembly configured to provide power to the motor assembly; and
    a steering assembly configured to effect turning of the vehicle by steering the two rear wheels, the steering assembly comprising:
        a pair of pivotal control arms, each control arm attached to a respective one of the rear wheels, wherein each one of the rear wheels is turned when the associated control arm is pivoted;
        a coupler operatively attached to the pair of control arms, the coupler configured to link the control arms to pivot cooperatively; and
        a pair of moveable handles adapted to be grasped by a child sitting on the seat of the vehicle, each handle attached to a respective one of the control arms, wherein the handles operate in tandem and move reciprocally to steer the rear wheels.

2. The children's vehicle of claim 1, wherein the steering assembly further comprises steering linkages adapted to link the moveable handles to the control arms.

3. The children's vehicle of claim 1, wherein each of the handles moves between a forward position toward the front of the body and a rearward position toward the rear of the body.

4. The children's vehicle of claim 1, wherein the vehicle has an elongate axis and further wherein each of the handles pivots about an axis that extends generally transverse to the elongate axis of the vehicle.

5. The children's vehicle of claim 1, wherein each of the control arms pivots about an upright axis extending through the ground surface.

6. The children's vehicle of claim 1, wherein the steering assembly further comprises a handle assembly support coupled to each of the handles and the body and adapted to permit the handles to pivot.

7. The children's vehicle of claim 1, wherein the coupler is adapted to maintain a spaced relationship between the pair of control arms.

8. A children's ride-on vehicle, comprising:
  a vehicle body having a seat adapted to accommodate a child;
  a plurality of wheels rotatably coupled to the body, wherein the plurality of wheels includes a first rear wheel and a second rear wheel;
  a motor assembly configured to drive at least one of the first rear wheel and the second rear wheel;
  a battery assembly configured to provide power to the motor assembly; and
  a steering assembly configured to effect turning of the vehicle by steering the first and second rear wheels, the steering assembly comprising:
    a displaceable first handle operatively coupled to the first rear wheel, where when the first handle is displaced the first rear wheel is turned about a generally vertical axis;
    a displaceable second handle operatively coupled to the second rear wheel, where when the second handle is displaced the second rear wheel is turned about a generally vertical axis; and
    a coupler adapted to link turning of the first rear wheel and the second rear wheel, wherein movement of the first handle in a first direction is accompanied by a reciprocal motion of the second handle in a second direction which is opposite and parallel to the first direction and wherein the first rear wheel and the second rear wheel turn cooperatively to steer the vehicle responsive to movement of the handles.

9. The children's vehicle of claim 8, wherein the steering assembly further comprises a first control arm and a second control arm, wherein each control arm is configured to couple the respective rear wheel to the first handle and second handle.

10. The children's vehicle of claim 9, wherein the steering assembly further comprises steering linkages adapted to link each handle to the respective control arm.

11. The children's vehicle of claim 9, wherein the coupler is adapted to maintain a spaced relationship between the first control arm and second control arm.

12. The children's vehicle of claim 8, the steering assembly further comprising a handle assembly support coupled to each of the handles and adapted to link the pair of handles together.

13. The children's vehicle of claim 8, wherein the steering assembly further comprises a handle assembly support which is coupled to the body and to the first handle and the second handle, wherein the handle assembly support is configured such that the first handle and second handle may pivot in the first direction and second direction.

14. The children's vehicle of claim 8, wherein the body is shaped to resemble a skid steer loader.

15. The children's vehicle of claim 8, further comprising a bucket assembly attached to the vehicle body.

16. The children's vehicle of claim 8, further comprising a roll cage attached to the vehicle body.

17. A children's ride-on vehicle, comprising:
  a vehicle body having a seat adapted to accommodate a child;
  a plurality of wheels rotatably coupled to the body, including a pair of rear wheels;
  a motor assembly configured to drive at least one of the rear wheels;
  a battery assembly configured to provide power to the motor assembly; and
  a steering assembly configured to turn the vehicle by steering the pair of rear wheels, the steering assembly comprising:
    at least two pivotal control arms, each control arm pivotal about a generally vertical axis, wherein each control arm is coupled to a respective wheel and wherein the control arms are coupled to each other such that the pair of wheels turn in tandem when the control arms are pivoted; and
    a steering control assembly adapted to be grasped by a child sitting on the seat of the vehicle body, wherein the steering control assembly is coupled to the control arms and configured to pivot the control arms.

18. The children's vehicle of claim 17, wherein the steering control assembly includes a first handle and a second handle which extend from the vehicle body and are configured to be grasped by a child sitting on the seat.

19. The children's vehicle of claim 18, wherein the first handle and second handle move reciprocally.

20. The children's vehicle of claim 17, wherein the steering assembly includes a steering linkage, which is adapted to couple the control arms to the steering control assembly.

21. The children's vehicle of claim 17, wherein the body is shaped to resemble a skid steer loader.

22. The children's vehicle of claim 17, further comprising a moveable bucket assembly attached to the vehicle body.

23. The children's vehicle of claim 17, further comprising a simulated roll cage attached to the vehicle body.

* * * * *